(12) United States Patent
Tamura

(10) Patent No.: US 7,003,945 B2
(45) Date of Patent: Feb. 28, 2006

(54) EXHAUST EMISSION CONTROL DEVICE FOR INTERNAL COMBUSTION ENGINE

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/868,981

(22) Filed: Jun. 17, 2004

(65) Prior Publication Data

US 2004/0255574 A1    Dec. 23, 2004

(30) Foreign Application Priority Data

Jun. 18, 2003   (JP)   ............................. 2003-173895

(51) Int. Cl.
*F01N 3/00*   (2006.01)

(52) U.S. Cl. .................... 60/286; 60/274; 60/285; 123/300; 123/443

(58) Field of Classification Search ................ 60/274, 60/276, 285, 286; 123/300, 443, 299
See application file for complete search history.

(56) References Cited

U.S. PATENT DOCUMENTS 5,974,788 A * 11/1999 Hepburn et al. ............. 60/274
6,161,378 A * 12/2000 Hanaoka et al. ............ 60/286
6,199,373 B1 * 3/2001 Hepburn et al. ............ 60/274
6,374,597 B1 * 4/2002 Bidner et al. ............... 60/285
6,766,641 B1 * 7/2004 Surnilla et al. ............. 60/285

FOREIGN PATENT DOCUMENTS

JP        2002-89250 A      3/2002

* cited by examiner

*Primary Examiner*—Binh Q. Tran
(74) *Attorney, Agent, or Firm*—Birch, Stewart, Kolasch & Birch, LLP

(57) ABSTRACT

An exhaust emission control device for internal combustion engine comprising air-fuel ratio modulating means and air-fuel ratio modulation adjusting means. The air-fuel ratio modulation adjusting means adjusts a lean period to be longer or the degree of leaning to be higher, during which the air-fuel ratio of exhaust gas is a lean air-fuel ratio, compared with when an oxygen storage (S10) of a three-way catalyst exceeds a first given value X1 if the oxygen storage is not higher than the first given value X1 (S16, S18), and adjusts a rich period to be longer or the degree of enriching to be higher, during which the exhaust air-fuel ratio is a rich air-fuel ratio, compared with when a reducing agent storage (S12) exceeds a second given value Y1 if the reducing agent storage is not higher than the second given value Y1 (S20, S22).

19 Claims, 7 Drawing Sheets

EXHAUST EMISSION CONTROL DEVICE FOR INTERNAL COMBUSTION ENGINE

CROSS-REFERENCE TO RELATED APPLICATION

This nonprovisional application claims priority under 35 U.S.C. 119(a) on Patent Application No. 2003-173895 filed in Japan on Jun. 18, 2003, the entire contents of which are incorporated herein by reference.

BACKGROUND OF THE INVENTION

1. Field of the Invention

The present invention relates to an exhaust emission control device for internal combustion engine, and more specifically, to a technique for improving exhaust gas purification efficiency with use of a three-way catalyst.

2. Description of the Related Art

In general, three-way catalysts are widely used as exhaust gas purifying catalysts for vehicular internal combustion engines. The three-way catalysts are constructed so that they can approximate the air-fuel ratio of exhaust gas to the theoretical air-fuel ratio (stoichiometric ratio), thereby optimizing the oxidation of HC and CO and the reduction of NOx and accelerating exhaust gas purification.

Recently, there has been developed a three-way catalyst that has a so-called oxygen ($O_2$) storage component (OSC). The OSC is a function that is intended to maximize the performance of a three-way catalyst. The catalyst with the OSC stores oxygen in lean air-fuel ratio operation to form a near-stoichiometric catalyst atmosphere temporarily, thereby purifying NOx. Thereafter, the catalyst releases the stored oxygen in rich air-fuel ratio operation, thereby accelerating purification of HC and CO.

Another three-way catalyst that has a so-called CO storage component (COSC) has also been developed (Jpn. Pat. Appln. KOKAI Publication No. 2002-89250). The catalyst with the COSC stores a reducing agent, such as CO, in rich air-fuel ratio operation, and thereafter, releases the stored CO in lean air-fuel ratio operation, thereby accelerating purification of NOx.

A three-way catalyst that combines the OSC and the COSC has also been developed.

With use of the three-way catalyst of this type, air-fuel ratio modulation control is carried out between lean and rich air-fuel ratio operations, and storage and release of oxygen and CO or the like are alternately repeated. Thus, HC and CO, along with NOx, can be continuously purified with high efficiency.

When a vehicle is accelerated or decelerated, supply of a fuel to an internal combustion engine sometimes cannot follow a command value, and transportation of the fuel is liable to be delayed. If the air-fuel ratio modulation control is carried out with an exhaust air-fuel ratio set so that the three-way catalyst having the OSC and the COSC is in an optimum state, in this case, an error is temporarily caused between the set exhaust air-fuel ratio and an actual exhaust air-fuel ratio. In consequence, the lean and rich air-fuel ratio operations are unbalanced, and the exhaust air-fuel ratio may possibly overshift to the lean or rich air-fuel ratio side.

If the balance between the lean and rich air-fuel ratio operations is broken, the state of the three-way catalyst is not optimum any longer. If the exhaust air-fuel ratio overshifts to the lean air-fuel ratio side, for example, an oxygen-rich state is established. Accordingly, the OSC ability is exceeded, and the catalyst is entirely in an oxidative atmosphere. Thus, a so-called NOx spike is generated, and the NOx purification rate temporarily lowers by a large margin. If the exhaust air-fuel ratio overshifts to the rich air-fuel ratio side, on the other hand, a CO-rich state is established. Accordingly, the COSC ability is exceeded, and the catalyst is entirely in a reducing atmosphere. Thus, a so-called HC. CO spike is generated, and the HC and CO purification rates temporarily lower by a large margin.

SUMMARY OF THE INVENTION

The present invention has been made in consideration of these problems, and its object is to provide an exhaust emission control device for internal combustion engine, capable of securely restraining generation of a NOx or HC. CO spike, if temporarily, thereby keeping the exhaust gas purification efficiency.

An exhaust emission control device for internal combustion engine of the present invention comprises: a three-way catalyst which is located in an exhaust passage of an internal combustion engine and combines an oxygen storage component capable of storing oxygen and a reducing agent storage component capable of storing a reducing agent; air-fuel ratio modulating means which modulates the air-fuel ratio of exhaust gas flowing into the three-way catalyst between a lean air-fuel ratio and a rich air-fuel ratio; oxygen storage estimating means for estimating an oxygen storage by the oxygen storage component; reducing agent storage estimating means for estimating a reducing agent storage by the reducing agent storage component; and air-fuel ratio modulation adjusting means which adjusts a lean period to be longer or the degree of leaning to be higher, during which the exhaust air-fuel ratio is a lean air-fuel ratio, compared with when the oxygen storage estimated by the oxygen storage estimating means exceeds a first given value if the oxygen storage is not higher than the first given value, and adjusts a rich period to be longer or the degree of enriching to be higher, during which the exhaust air-fuel ratio is a rich air-fuel ratio, compared with when the reducing agent storage estimated by the reducing agent storage estimating means exceeds a second given value if the reducing agent storage is not higher than the second given value.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will now be described with reference to the accompanying drawings.

A first embodiment will be described first.

Figure 1:
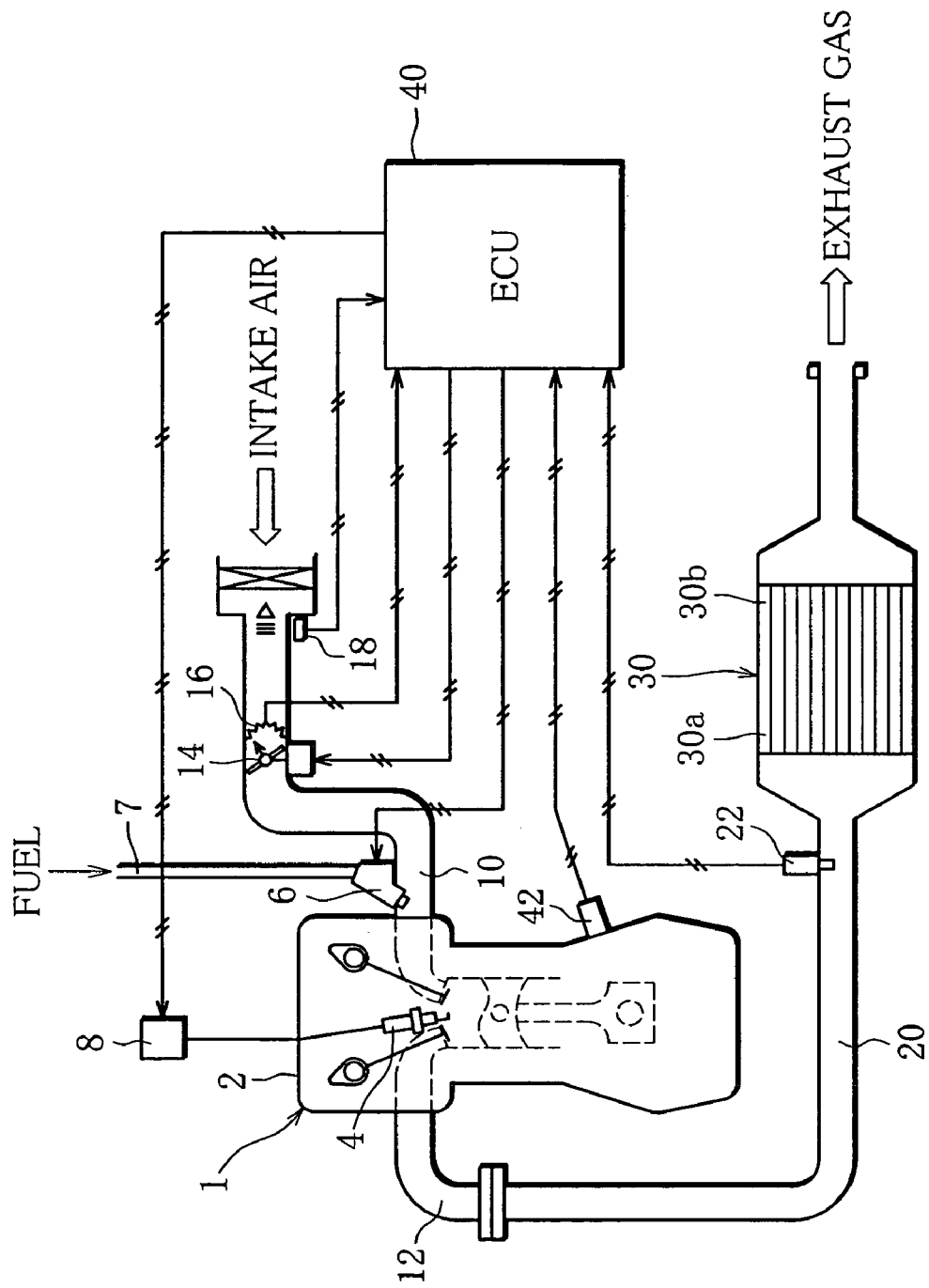
FIG. 1 is a diagram showing an outline of an exhaust emission control device for internal combustion engine according to a first embodiment of the present invention, which is mounted in a vehicle.

Referring to FIG. 1, there is shown an outline of an exhaust emission control device for internal combustion engine according to the present invention, which is mounted in a vehicle. The following is a description of a configuration of this control device.

As shown in FIG. 1, a multi-point injection (MPI) gasoline engine is used for an engine body (hereinafter referred to simply as engine) 1, an internal combustion engine.

A cylinder head 2 of the engine 1 is fitted with spark plugs 4 for individual cylinders. Each plug 4 is connected with an ignition coil 8 that outputs high voltage.

The cylinder head 2 is formed with intake ports for the individual cylinders. One end of an intake manifold 10 is connected to the head 2 so as to communicate with each intake port. The intake manifold 10 is fitted with an electromagnetic fuel injection valve 6. A fuel supply unit (not shown) having a fuel tank is connected to the valve 6 by means of a fuel pipe 7.

An electromagnetic throttle valve 14 for adjusting an intake air mass and a throttle position sensor (TPS) 16 for detecting the throttle position of the valve 14 are located on the upstream side of the intake manifold 10 with respect to the fuel injection valve 6. Further, an airflow sensor 18 for measuring the intake air mass is located on the upstream side of the throttle valve 14. The airflow sensor 18 used is of the Karman-eddy type The cylinder head 2 is formed with exhaust ports for the individual cylinders. One end of an exhaust manifold 12 is connected to the head 2 so as to communicate with each exhaust port.

Since this MPI engine is a conventional one, a detailed description of the engine is omitted.

An exhaust pipe (exhaust passage) 20 is connected to the other end of the control circuit board 12. The exhaust pipe 20 is provided with a monolithic three-way catalyst 30 as an exhaust gas purifying catalyst unit, of which a carrier has a latticed cross section.

In the three-way catalyst 30, a wash coat on the surface of the carrier contains copper (Cu), cobalt (Co), silver (Ag), platinum (Pt), rhodium (Rh), or palladium (Pd) as an active noble metal. Further, the wash coat of the catalyst 30 contains cerium (Ce), zirconium (Zr), etc.

The cerium, zirconium, etc. have an $O_2$ storage component (hereinafter referred to also as OSC). If the three-way catalyst 30 stores (or adsorbs or occludes) oxygen ($O_2$) in an oxidative atmosphere of which the exhaust air-fuel ratio (exhaust A/F) is a lean air-fuel ratio (lean A/F), therefore, the $O_2$ is maintained as stored $O_2$ until the exhaust A/F becomes a rich air-fuel ratio (rich A/F) so that a reducing atmosphere is obtained. The stored $O_2$ can oxidize and remove HC (hydrocarbon) and CO (carbon monoxide) even in the reducing atmosphere.

Further, the Ce, Zr, etc. also have a reducing agent (CO) storage component (hereinafter referred to also as COSC) to store a reducing agent such as $H_2$ or CO (hereinafter referred to as CO or CO, etc.). Therefore, the three-way catalyst 30 stores CO in a reducing atmosphere of which the exhaust A/F is the rich A/F, and maintains the CO as stored CO until the exhaust A/F becomes the lean A/F so that an oxidative atmosphere is obtained. The stored CO can oxidize and remove NOx even in the oxidative atmosphere.

Thus, the three-way catalyst 30 can fulfill its high purifying performance when the OSC and the COSC are well-balanced.

Actually, in the three-way catalyst 30 that is doped with the Ce, Zr, etc. as the OSC and the COSC, the ability of the OSC is higher than that of the COSC, so that much $O_2$ is liable to be preferentially stored by an exhaust upstream side portion 30a, and much CO or the like in an exhaust downstream side portion 30b. In other words, the catalyst 30 that is doped with the Ce, Zr, etc. has the oxygen storage component or OSC in the upstream side portion 30a and the reducing agent storage component or COSC in the downstream side portion 30b. Thus, the OSC and the COSC can function individually satisfactorily in the catalyst 30.

Located on the upstream side of the three-way catalyst 30 of the exhaust pipe 20 is an air-fuel ratio sensor 22, which detects an exhaust air-fuel ratio or actual air-fuel ratio (actual A/F) in accordance with the oxygen concentration of exhaust gas. The air-fuel ratio sensor 22 may be either a linear A/F sensor (LAFS) or an $O_2$ sensor.

An ECU (electronic control unit) 40 comprises an input/output unit, storage units (ROM, RAM, etc.), central processing unit (CPU), timer counter, etc. The ECU 40 generally controls the exhaust emission control device including the engine 1.

Various sensors are connected to the input side of the ECU 40. They include a crank angle sensor 42 for detecting the crank angle of the engine 1, besides the TPS 16, airflow sensor 18, air-fuel ratio sensor 22. Detection information from these sensors is applied to the input of the ECU 40. An engine speed Ne is detected according to crank angle information from the crank angle sensor 42.

On the other hand, various output devices, such as the fuel injection valve 6, ignition coil 8, throttle valve 14, etc., are connected to the output side of the ECU 40. A fuel injection quantity, fuel injection timing, ignition timing, etc., which are computed in accordance with the detection information from the various sensors, are delivered to the output devices.

Specifically, the air-fuel ratio is set to an appropriate target air-fuel ratio (target A/F) in accordance with the detection information from the various sensors. A quantity of a fuel corresponding to the target A/F is injected from the fuel injection valve 6 at an appropriate timing, the throttle valve 14 is adjusted to a proper throttle position, and spark ignition is carried out at an appropriate timing by the spark plug 4.

More specifically, the three-way catalyst 30 can fulfill its high purifying performance when the OSC and the COSC are well-balanced, as mentioned before, so that there is an appropriate exhaust A/F (e.g., stoichiometric) that can thus balance the OSC and the COSC. The target A/F is set to this appropriate exhaust A/F.

According to this exhaust emission control device, the exhaust A/F is compulsorily alternately switched between rich and lean air-fuel ratios to fulfill the ability of the three-way catalyst 30 by effectively utilizing the OSC and the COSC. After the exhaust A/F is set to a given rich air-fuel ratio, in this case, it is changed to a given lean air-fuel ratio for a given period of time. Thereafter, it is modulated again to the given rich air-fuel ratio (square or wavy wave), and the target A/F is subjected to air-fuel ratio modulation (compulsory modulation) such that the lean and rich air-fuel ratios are cyclically repeated with the target A/F between them (air-fuel ratio modulating means). Actually, the combustion air-fuel ratio (combustion A/F) in a combustion chamber of the engine 1 is compulsorily modulated between the rich and lean air-fuel ratios in accordance with detection information from the air-fuel ratio sensor 22 so that the exhaust A/F is adjusted to the given lean and rich air-fuel ratio.

If transportation of the fuel to be supplied to the engine 1 is delayed when the vehicle is accelerated or decelerated, despite the air-fuel ratio modulation with the appropriate target A/F set in this manner, the actual exhaust A/F tends temporarily to overshift to the lean or rich air-fuel ratio side. If the exhaust A/F overshifts to the lean air-fuel ratio side, for example, an oxygen-rich state is established. Accordingly, the OSC ability is exceeded, and the three-way catalyst 30 is entirely in an oxidative atmosphere. Thus, a so-called NOx spike is generated, and the NOx purification rate temporarily lowers by a large margin. If the exhaust A/F overshifts to the rich air-fuel ratio side, on the other hand, a CO-rich state is established. Accordingly, the COSC ability is exceeded, and the three-way catalyst 30 is entirely in a reducing atmosphere. Thus, a so-called HC. CO spike is generated, and the HC and CO purification rates temporarily lower by a large margin.

In order to solve these problems, the air-fuel ratio modulation is adjusted in the exhaust emission control device according to the present invention. The following is a description of an air-fuel ratio modulation adjusting method according to the invention.

Figure 2:
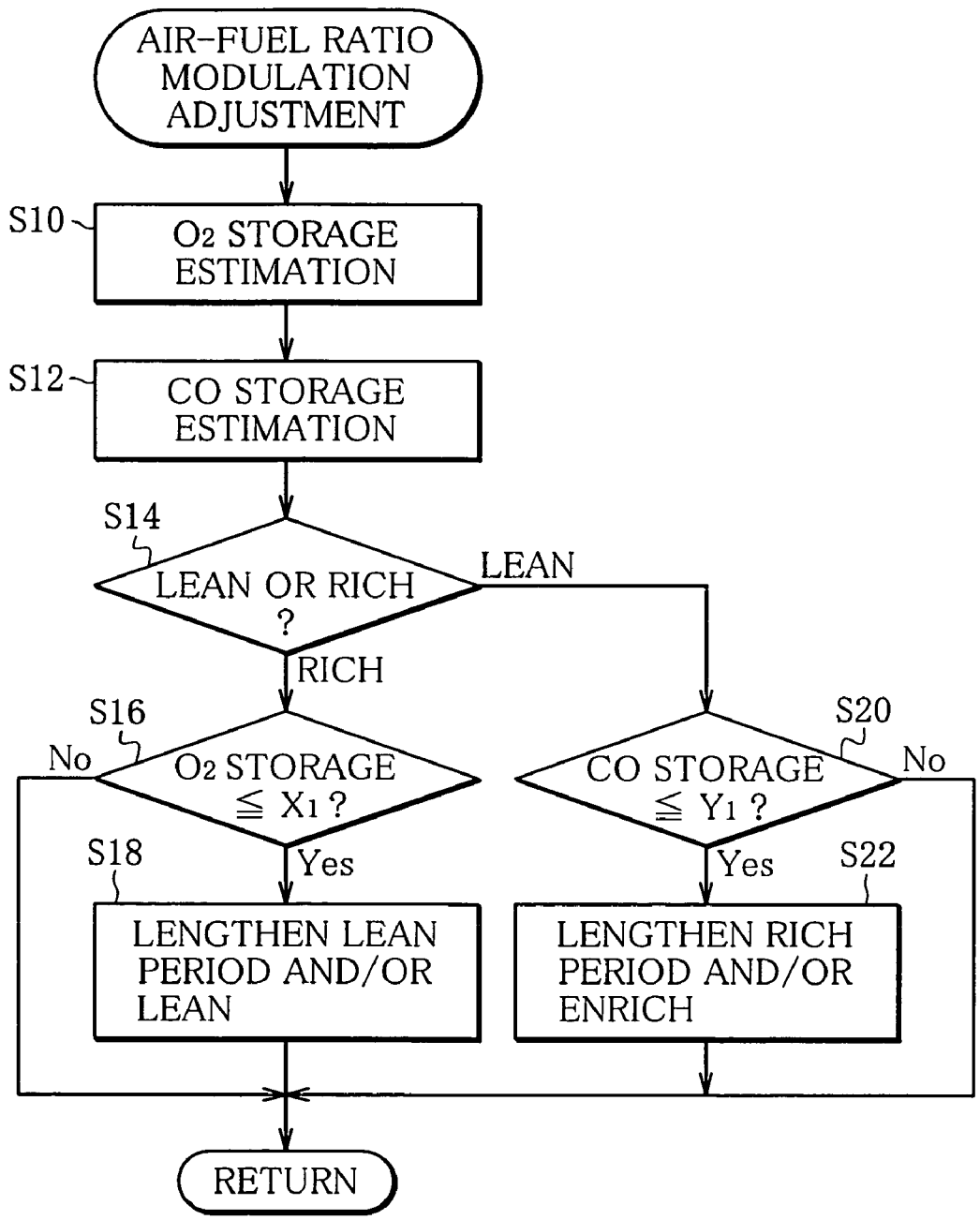
FIG. 2 is a flow chart showing a control routine for air-fuel ratio modulation adjustment control according to the invention.

Referring to FIG. 2, there is shown a flowchart that illustrates a control routine for air-fuel ratio modulation control according to the present invention (air-fuel ratio modulation adjusting means). The control routine will now be described with reference to this flow chart.

First, an $O_2$ storage by the OSC is estimated in Step S10 (oxygen storage estimating means), and a CO storage by the COSC is estimated in Step S12 (reducing agent storage estimating means).

Figure 3:
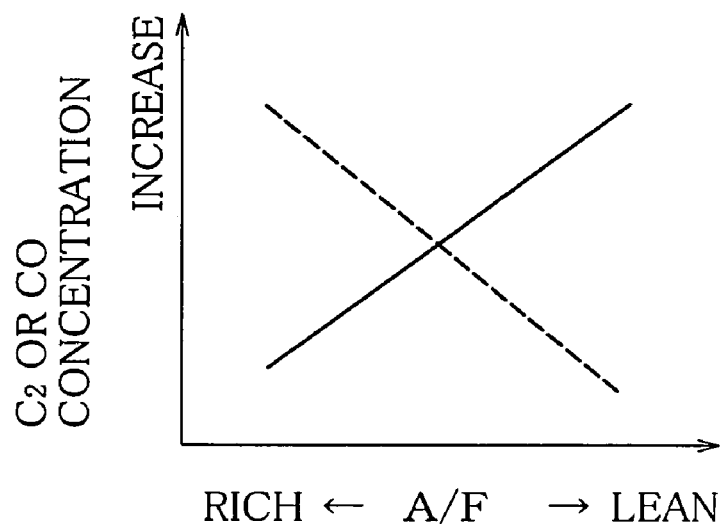
FIG. 3 is a diagram showing relations between an A/F, $O_2$ concentration (full line), and CO concentration (broken line)

As shown in FIG. 3, there are fixed relations between the A/F, $O_2$ concentration (full line), and CO concentration (broken line). The $O_2$ concentration and the CO concentration are obtained according to the exhaust A/F detected by the air-fuel ratio sensor 22, while an exhaust flow rate is obtained from intake air mass information from the airflow sensor 18. A catalyst $O_2$ inflow (catalyst oxygen inflow) and a catalyst CO inflow are obtained in accordance with the $O_2$ concentration and the CO concentration. Based on the catalyst $O_2$ inflow and the catalyst CO inflow, an $O_2$ storage and a CO storage are estimated from equations (1) and (2), respectively. In these equations, suffixes n and n−1 represent a last value and a preceding value, respectively.

$$O_2 \text{ storage } (n) = \text{Catalyst } O_2 \text{ inflow} - \text{Catalyst CO inflow} \times K1 + O_2 \text{ storage } (n-1), \quad (1)$$

$$CO \text{ storage } (n) = \text{Catalyst CO inflow} - \text{Catalyst } O_2 \text{ inflow} \times K2 + CO \text{ storage } (n-1). \quad (2)$$

Here K1 and K2 are transformation coefficients that can be obtained experimentally.

When the exhaust A/F is on the lean air-fuel ratio side, according to equations (1) and (2), it is estimated that the catalyst $O_2$ inflow is so much that the $O_2$ storage increases and the CO storage lessens. When the exhaust A/F is on the rich air-fuel ratio side, it is estimated that the catalyst CO inflow is so much that the CO storage increases and the $O_2$ storage lessens.

Although the exhaust flow rate is obtained from the intake air mass on the assumption that these values are substantially equal in this case, it may alternatively be detected in a direct manner.

Figure 4:
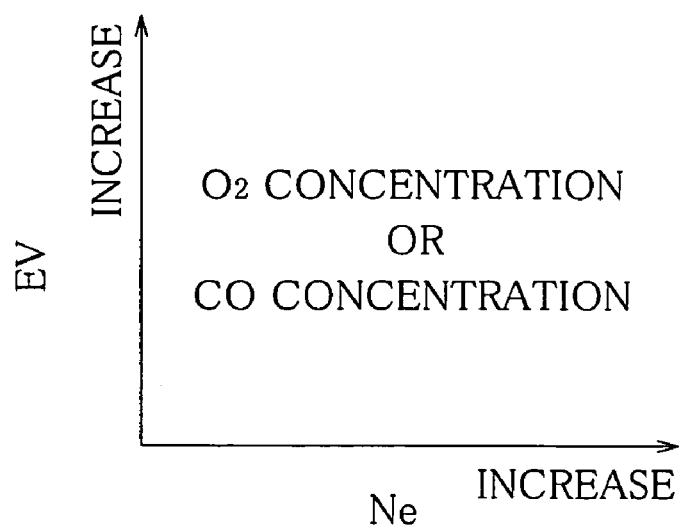
FIG. 4 is a diagram showing the relation between $O_2$ concentration and CO concentration compared with an engine speed Ne and a volume efficiency Ev.

In this case, moreover, the combustion A/F is set corresponding to the engine speed Ne and a volume efficiency Ev that is determined in accordance with the intake air mass, so that the $O_2$ concentration and the CO concentration can be also obtained from the engine speed Ne and the volume efficiency Ev, as shown in FIG. 4.

In Step S14, whether the exhaust A/F is being currently modulated to be on the lean air-fuel ratio side or to be on the rich air-fuel ratio side is determined in accordance with detection information from the air-fuel ratio sensor 22. If it is concluded by this decision that the exhaust A/F is being modulated to be on the rich air-fuel ratio side, the program advances to Step S16.

In Step S16, whether the estimated $O_2$ storage is not higher than a given quantity X1 (first given value) is determined. If the exhaust A/F is on the rich air-fuel ratio side, CO in the exhaust gas is stored in the catalyst by the COSC, and the stored $O_2$ is used for the oxidation of HC, CO, etc. in the exhaust gas and lessens. Whether the lessened $O_2$ storage is not higher than the given quantity X1 is determined.

If the decision in Step S16 is No and the $O_2$ storage is concluded to be higher than the given quantity X1, this routine is finished without any execution. If the decision is Yes and the $O_2$ storage is not concluded to be higher than the given quantity X1, on the other hand, the program advances to Step S18.

In Step S18, a lean period during which the exhaust A/F is modulated to be on the lean air-fuel ratio side in air-fuel ratio modulation is adjusted to be longer than in the case where the $O_2$ storage exceeds the given quantity X1. Alternatively, the degree of modulation (leaning gain, lean-side amplitude, etc.) of the exhaust A/F on the lean air-fuel ratio side is adjusted to be higher as the air-fuel ratio is leaned. A tuning parameter for the lean period and a leaning parameter should only be suitably set according to the operating state of the engine 1. Further, the lean period and the degree of leaning may be lengthened and increased, respectively.

If this is done, the $O_2$ storage by the OSC increases when the next exhaust A/F is modulated to be on the lean air-fuel ratio side. Even when the exhaust A/F is modulated to be on the rich air-fuel ratio side, thereafter, the $O_2$ storage never falls below the given quantity X1.

If it is concluded in Step S14 that the exhaust A/F is currently being modulated to be on the lean air-fuel ratio side, on the other hand, the program advances to Step S20.

In Step S20, whether the estimated CO storage is not higher than a given quantity Y1 (second given value) is determined. If the exhaust A/F is on the lean air-fuel ratio side, $O_2$ in the exhaust gas is stored in the catalyst by the OSC, and the stored CO is used for the reduction of $O_2$ and NOx in the exhaust gas and lessens. Whether the lessened CO storage is not higher than the given quantity Y1 is determined.

If the decision in Step S20 is No and the CO storage is concluded to be higher than the given quantity Y1, this routine is finished without any execution. If the decision is Yes and the CO storage is not concluded to be higher than the given quantity Y1, on the other hand, the program advances to Step S22.

In Step S22, a rich period during which the exhaust A/F is modulated to be on the rich air-fuel ratio side in the air-fuel ratio modulation is adjusted to be longer than in the case where the CO storage exceeds the given quantity Y1. Alternatively, the degree of modulation of the exhaust A/F on the rich air-fuel ratio side (enriching gain or rich-side amplitude) is adjusted to be higher as the air-fuel ratio is enriched. A tuning parameter for the rich period and an enriching parameter should only be suitably set according to the operating state of the engine 1, as in the aforesaid case. Further, the rich period and the degree of enriching may be lengthened and increased, respectively.

If this is done, the CO storage by the COSC increases when the next exhaust A/F is modulated to be on the rich air-fuel ratio side. Even when the exhaust A/F is modulated to be on the lean air-fuel ratio side, thereafter, the CO storage never falls below the given quantity Y1.

If the lean period or the degree of leaning is adjusted to be longer or higher than in the case where the $O_2$ storage exceeds the given quantity X1, divergence of the modulation period should be prevented by correspondingly adjusting the rich period or the degree of enriching to be shorter or lower than in the case where the CO storage exceeds the given quantity Y1. If the rich period or the degree of enriching is adjusted to be longer or higher than in the case where the CO storage exceeds the given quantity Y1, on the other hand, the lean period or the degree of leaning should be correspondingly adjusted to be shorter or lower than in the case where the $O_2$ storage exceeds the given quantity X1.

Thus, if the air-fuel ratio modulation is carried out, the air-fuel ratio modulation adjustment control can always keep the $O_2$ and CO storages higher than the given quantities X1 and Y1, respectively. In consequence, the stored $O_2$ and CO can always be left and kept satisfactorily in the three-way catalyst 30.

Figure 5:
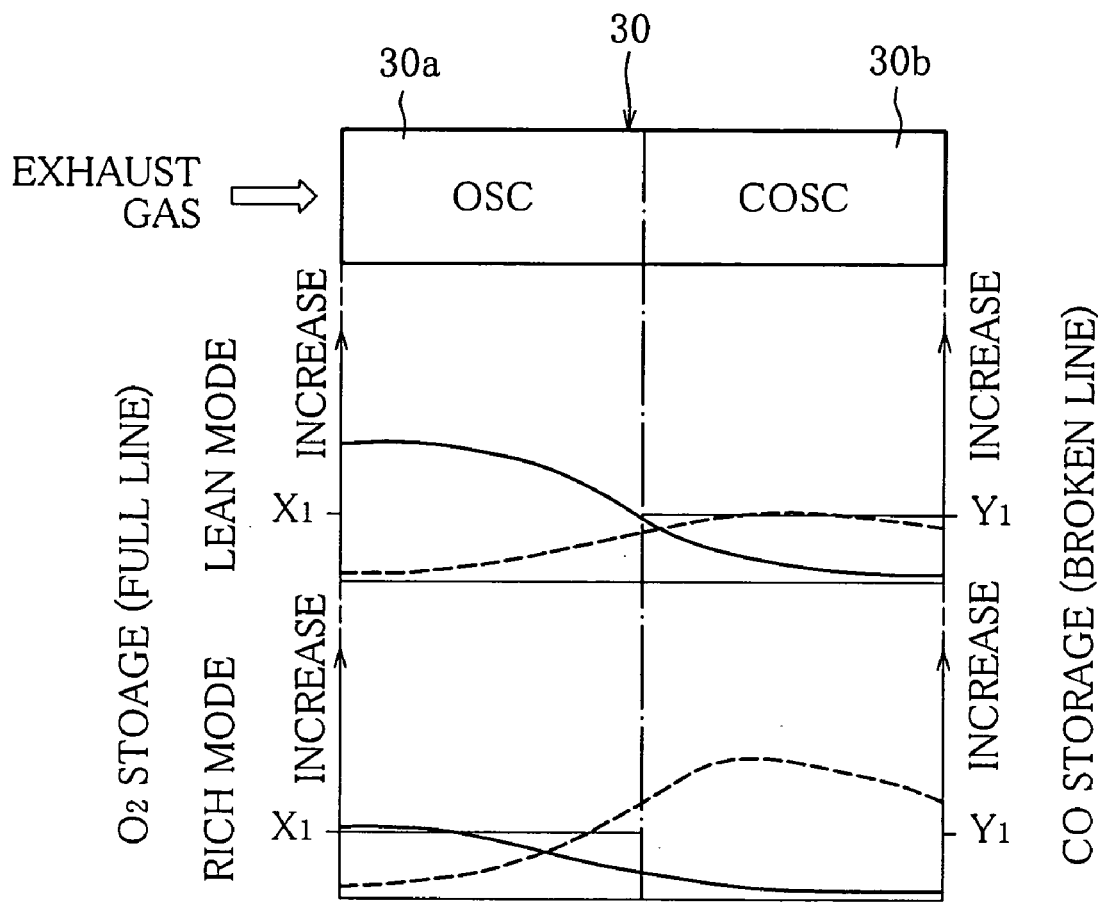
FIG. 5 is a diagram showing $O_2$ storages (full lines) and CO storages (broken lines) of the three-way catalyst obtained when the exhaust A/F is modulated to be on the lean and rich air-fuel ratio sides.

Referring to FIG. 5, there are schematically shown $O_2$ storages (full lines) and CO storages (broken lines) of the three-way catalyst 30 that are obtained when the exhaust A/F is modulated to be on the lean and rich air-fuel ratio sides. Thus, the $O_2$ storage can be kept not lower than the given quantity X1 in the upstream side portion 30a even when the exhaust A/F is modulated to be on the rich air-fuel ratio side. Even when the exhaust A/F is modulated to be on the lean air-fuel ratio side, the CO storage can be kept not lower than the given quantity Y1 in the downstream side portion 30b.

FIG. 5 shows only an example, and various other patterns may be formed without departing from the spirit of the invention. In FIG. 5, maximum values for the upstream and downstream side portions 30a and 30b are not lower than given quantities, for example. Alternatively, however, minimum values for the upstream and downstream side portions 30a and 30b may be set to be not lower than given quantities. Besides, total storages on the catalyst may be set to be not lower than given quantities.

As mentioned before, the stored $O_2$ and CO can always be left and kept satisfactorily in the three-way catalyst 30. Even if the actual exhaust A/F temporarily overshifts to the lean air-fuel ratio side, therefore, excessive $O_2$ and NOx in the exhaust gas can be satisfactorily reduced and removed by the remaining stored CO. Accordingly, the catalyst 30 cannot be entirely in an oxidative atmosphere. In consequence, generation of a NOx spike can be prevented securely. Even if the actual exhaust A/F temporarily overshifts to the rich air-fuel ratio side, on the other hand, excessive HC and CO in the exhaust gas can be satisfactorily oxidized and removed by the remaining stored $O_2$. Accordingly, the catalyst 30 cannot be entirely in a reducing atmosphere. In consequence, generation of an HC. CO spike can be prevented securely.

Thus, the NOx purification rate and the HC and CO purification rates cannot lower even temporarily by a large margin, and the exhaust gas purification efficiency of the three-way catalyst 30 can be kept high.

The following is a description of a second embodiment.

The second embodiment differs from the first embodiment only in that a three-way catalyst 300 is used in place of the three-way catalyst 30 shown in FIG. 1, and air-fuel ratio modulation adjustment control is carried out with reference to the flow chart of FIG. 2. Therefore, configurations, functions, and effects that are not shared by the first embodiment will be described in the following.

Figure 6:
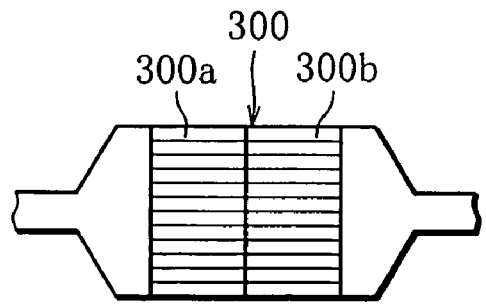
FIG. 6 is a view showing a three-way catalyst according to a second embodiment.

As shown in FIG. 6, the three-way catalyst 300 is composed of an upstream side portion 300a and a downstream side portion 300b that are coupled integrally to each other. The upstream side portion 300a is doped with cerium (Ce) or zirconium (Zr) as the OSC, as well as the noble metal. On the other hand, the downstream side portion 300b is doped with an alkaline earth metal, such as barium (Ba), calcium (Ca), or magnesium (Mg), as the COSC having particularly high COSC ability, as well as the noble metal.

With use of the three-way catalyst 300 constructed in this manner, $O_2$ is stored satisfactorily in the upstream side portion 300a also on account of the high OSC ability, while CO or the like is stored satisfactorily in the downstream side portion 300b. As in the aforementioned case, therefore, the stored $O_2$ and CO can always be left and kept satisfactorily in the catalyst 300. Thus, generation of a NOx or HC. CO spike can be also prevented securely, and the exhaust gas purification efficiency of the catalyst 300 can be kept high.

The following is a description of a third embodiment.

The third embodiment differs from the foregoing embodiments in that a three-way catalyst 301 is used in place of the three-way catalyst 30.

Figure 7:
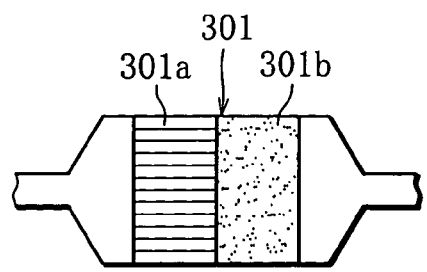
FIG. 7 is a view showing a three-way catalyst according to a third embodiment.

As shown in FIG. 7, the three-way catalyst 301 is composed of an upstream side portion 301a and a downstream side portion 301b that are coupled integrally to each other. The upstream side portion 301a is doped with Ce, Zr, etc. as the OSC, as well as the noble metal. On the other hand, the downstream side portion 301b is formed having a large number of pores in a wash coat, as well as the noble metal.

Figures 8A, 8B, 8C:
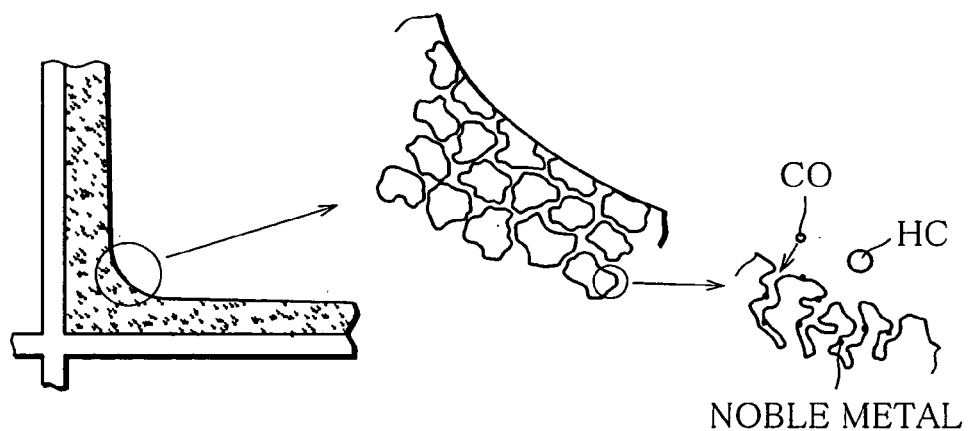
FIGS. 8(a), 8(b) and 8(c) are views showing details of pores in the three-way catalyst.

FIG. 8(a) is a view showing a quarter portion of a unit grid of the three-way catalyst 301. FIG. 8(b) is an enlarged view of the catalyst having the quarter portion coated. FIG. 8(c) is an enlarged view of one particle of the wash coat. As shown in detail in FIG. 8(c), the pores that are formed in the wash coat are elongate slits.

As shown in FIG. 8(c), the pores have opening areas such that HC particles that are larger than CO particles cannot get into them and that the smaller CO particles can smoothly get into them. Thus, the wash coat can satisfactorily store CO and the like in the downstream side portion 301b.

Accordingly, $O_2$ is stored satisfactorily in the upstream side portion 301a also on account of the high OSC ability, and CO or the like is stored satisfactorily in the downstream side portion 301b. As in the aforementioned case, the stored $O_2$ and CO can always be left and kept satisfactorily in the three-way catalyst 301. Thus, generation of a NOx or HC. CO spike can be also prevented securely, and the exhaust gas purification efficiency of the catalyst 301 can be kept high.

In this case, the downstream side portion 301b may be doped with Ce, Zr, etc. or a combination of alkaline earth metals, such as Ba, Ca, Mg, etc. Thus, the COSC of the downstream side portion 301b can be strengthened, the OSC and COSC abilities of the upstream side portion 301a can be equalized, and CO or the like can be stored more satisfactorily in the downstream side portion 301b.

The following is a description of a fourth embodiment.

In the fourth embodiment, a three-way catalyst 302 is used in place of the three-way catalyst 30.

Figure 9:
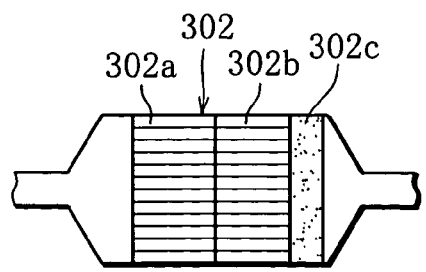
FIG. 9 is a view showing a three-way catalyst according to a fourth embodiment.

As shown in FIG. 9, the three-way catalyst 302 is composed of an upstream side portion 302a and an intermediate portion 302b, which are coupled integrally to each other, and a downstream side catalyst portion 302c having a large number of pores. The upstream side portion 302a is doped with Ce or Zr. The intermediate portion 302b is doped with an alkaline earth metal, such as Ba, Ca, or Mg. The downstream side catalyst portion 302c is located on the downstream side of the intermediate portion 302b.

Thus, the COSC can be also strengthened, the OSC and COSC abilities of the upstream side portion 302a can be equalized, and CO or the like can be stored more satisfactorily in the intermediate portion 302b and the downstream side catalyst portion 302c.

The following is a description of a fifth embodiment.

In the fifth embodiment, which is a modification of the second embodiment, a three-way catalyst 303 is used in place of the three-way catalyst 300.

Figure 10:
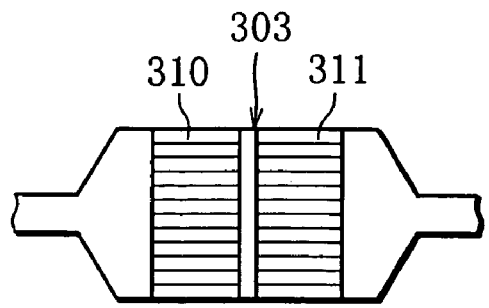
FIG. 10 is a view showing a three-way catalyst according to a fifth embodiment.

As shown in FIG. 10, the three-way catalyst 303 is composed of an upstream catalyst 310 and a downstream catalyst 311 that are arranged separately and in series with each other. The upstream catalyst 310 is doped with Ce or Zr, as the OSC, as well as the noble metal. On the other hand, the downstream catalyst 311 is doped with an alkaline earth metal, such as Ba, Ca, or Mg, as the COSC having particularly high COSC ability, as well as the noble metal.

Therefore, the OSC and the COSC can be effectively added in an independent manner. Accordingly, $O_2$ is stored satisfactorily and effectively in the upstream catalyst 310 also on account of the high OSC ability, and CO or the like is stored satisfactorily and effectively in the downstream catalyst 311. As in the aforementioned case, the stored $O_2$ and CO can always be left and kept satisfactorily in the three-way catalyst 303. Thus, generation of a NOx or HC. CO spike can be also prevented securely, and the exhaust gas purification efficiency of the catalyst 303 can be kept high.

The following is a description of a sixth embodiment.

In the sixth embodiment, which is a modification of the third embodiment, a three-way catalyst 304 is used in place of the three-way catalyst 301.

Figure 11:
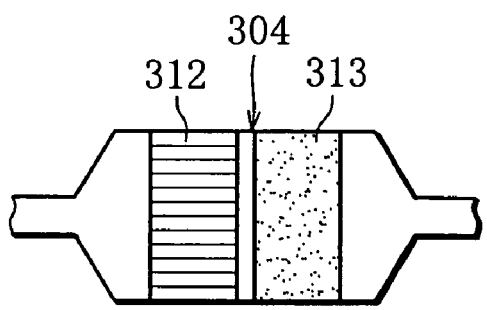
FIG. 11 is a view showing a three-way catalyst according to a sixth embodiment.

As shown in FIG. 11, the three-way catalyst 304 is composed of an upstream catalyst 312 and a downstream catalyst 313 that are arranged separately and in series with each other. The upstream catalyst 312 is doped with Ce or Zr, as the OSC, as well as the noble metal. On the other hand, the downstream catalyst 313 is formed having a large number of pores in a wash coat, as well as the noble metal (see FIG. 8).

As in the aforementioned case, therefore, $O_2$ is stored satisfactorily and effectively in the upstream catalyst 312 also on account of the high OSC ability, CO or the like is stored satisfactorily and effectively in the downstream catalyst 313, and the stored $O_2$ and CO can always be left and kept satisfactorily in the three-way catalyst 304. Thus, generation of a NOx or HC. CO spike can be also prevented securely, and the exhaust gas purification efficiency of the catalyst 304 can be kept high.

If the downstream catalyst 313 is doped with Ce, Zr, etc. or a combination of alkaline earth metals, such as Ba, Ca, Mg, etc., in particular, the COSC of the downstream catalyst 313 can be strengthened efficiently, the OSC and COSC abilities of the upstream catalyst 312 can be equalized, and CO or the like can be stored more satisfactorily in the downstream catalyst 313.

The following is a description of a seventh embodiment.

In the seventh embodiment, which is a modification of the fourth embodiment, a three-way catalyst 305 is used in place of the three-way catalyst 302.

Figure 12:
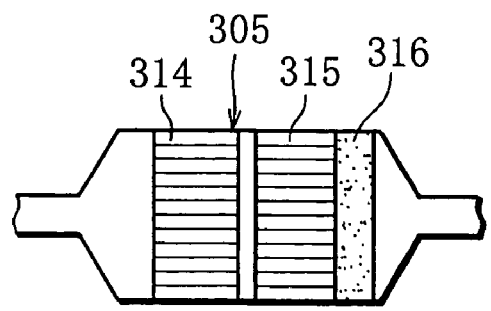
FIG. 12 is a view showing a three-way catalyst according to a seventh embodiment.

As shown in FIG. 12, the three-way catalyst 305 is composed of an upstream catalyst 314 and an intermediate catalyst 315, which are arranged separately and in series with each other, and a downstream catalyst 316 having a large number of pores. The upstream catalyst 314 is doped with Ce or Zr. The intermediate catalyst 315 is doped with an alkaline earth metal, such as Ba, Ca, or Mg. The downstream catalyst 316 is located integrally with or separately from the intermediate catalyst 315 on the downstream side thereof.

Thus, the COSC can be also strengthened, the OSC and COSC abilities of the upstream catalyst 314 can be equalized, and CO or the like can be stored more satisfactorily in the intermediate catalyst 315 and the porous downstream catalyst 316.

The following is a description of an eighth embodiment.

The eighth embodiment differs from the foregoing embodiments in that a three-way catalyst 306 is used in place of the three-way catalyst 30.

Figure 13:
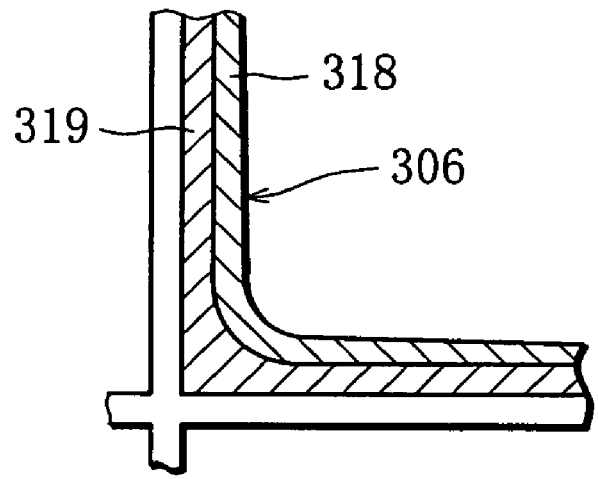
FIG. 13 is a view showing a quarter portion of a unit grid of a three-way catalyst according to an eighth embodiment.

Referring to FIG. 13, there is shown a quarter portion of a unit grid of the three-way catalyst 306. The catalyst 306 is composed of an upper catalyst 318 and a lower catalyst 319 that are coated in layers on a carrier. The upper catalyst 318 is doped with Ce or Zr. The lower catalyst 319 is doped with an alkaline earth metal, such as Ba, Ca, or Mg.

With use of the three-way catalyst 306 constructed in this manner, $O_2$ is stored satisfactorily in the upper catalyst 318 also on account of the high OSC ability, while CO or the like is stored satisfactorily in the lower catalyst 319. As in the aforementioned case, therefore, the stored $O_2$ and CO can always be left and kept satisfactorily in the catalyst 306. Thus, generation of a NOx or HC. CO spike can be prevented securely with the compact configuration, and the exhaust gas purification efficiency of the catalyst 306 can be kept high even in the case where the overall length of the catalyst 306 is expected to be reduced.

The following is a description of a ninth embodiment.

In the ninth embodiment, which is a modification of the eighth embodiment, a three-way catalyst 307 is used in place of the three-way catalyst 306.

Figure 14:
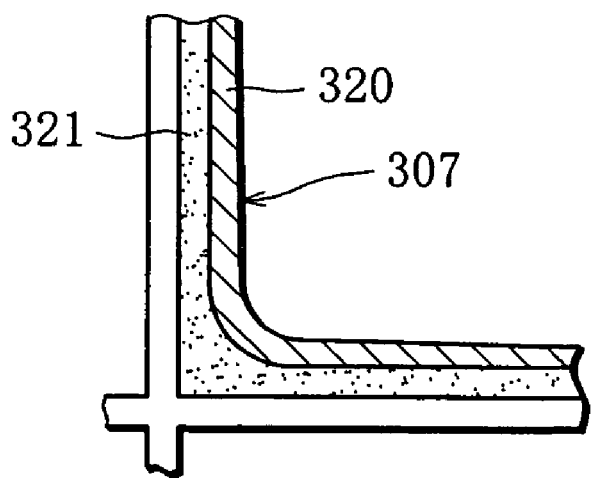
FIG. 14 is a view showing a quarter portion of a unit grid of a three-way catalyst according to a ninth embodiment.

Referring to FIG. 14, there is shown a quarter portion of a unit grid of the three-way catalyst 307. The catalyst 307 is composed of an upper catalyst 320 and a lower catalyst 321 that are coated in layers on a carrier. The upper catalyst 307 is doped with Ce or Zr, and the lower catalyst 321 has a large number of pores.

Accordingly, $O_2$ is stored satisfactorily in the upper catalyst 320 also on account of the high OSC ability, and CO or the like is stored satisfactorily in the lower catalyst 321. As in the aforementioned case, the stored $O_2$ and CO can always be left and kept satisfactorily in the three-way catalyst 307. Thus, generation of a NOx or HC. CO spike can be also prevented securely with the compact configuration, and the exhaust gas purification efficiency of the catalyst 307 can be kept high.

If the lower catalyst 321 is doped with Ce, Zr, etc. or a combination of alkaline earth metals, such as Ba, Ca, Mg, etc., in particular, the COSC of the catalyst 321 can be strengthened, the OSC and COSC abilities of the catalyst 321 can be equalized, and CO or the like can be stored more satisfactorily in the catalyst 321.

It is to be understood that the present invention is not limited to the embodiments described above.

In the second to ninth embodiments, for example, the upstream side portions 300a, 301a and 302a, upstream catalysts 310, 312 and 314, or upper catalysts 318 and 320 are given the OSC function, and the lower side portions 300b, 301b and 302b (including the catalyst portion 302c), downstream catalysts 311, 313 and 315 (including the catalyst 316), or lower catalysts 319 and 321 are given the COSC function. Alternatively, however, the upstream side portions may be replaced with the downstream side portions; the upstream catalysts with the downstream catalysts, and the upper catalysts with the lower catalysts. As an alternative embodiment, the upstream side portions, upstream catalysts, and upper catalysts may be given the COSC function. In this case, the downstream side portions, downstream catalysts, and lower catalysts are given the OSC function.

With this arrangement, the stored CO and $O_2$ can be also left and kept individually satisfactorily in the three-way catalyst. Even if the actual exhaust A/F temporarily over-shifts to the lean air-fuel ratio side, therefore, excessive $O_2$ and NOx in the exhaust gas can be satisfactorily reduced and removed by the remaining stored CO. Accordingly, the catalyst cannot be entirely in an oxidative atmosphere. In consequence, generation of a NOx spike can be prevented securely. Even if the actual exhaust A/F temporarily over-shifts to the rich air-fuel ratio side, on the other hand, excessive HC and CO in the exhaust gas can be satisfactorily oxidized and removed by the remaining stored $O_2$. Accordingly, the catalyst cannot be entirely in a reducing atmosphere. In consequence, generation of an HC. CO spike can be prevented securely. Thus, the exhaust gas purification efficiency of the three-way catalyst can be also kept high.

According to the foregoing embodiments, moreover, the air-fuel ratio modulation is compulsory modulation. Alternatively, however, it may be modulation (air-fuel ratio modulating means) that is supported by stoichiometric feedback control based on rich-lean decision by the air-fuel ratio sensor 22. In this case, the degree of modulation of the exhaust A/F on the lean or rich air-fuel ratio side (leaning or enriching gain or lean- or rich-side amplitude) should only be adjusted.

If the air-fuel ratio sensor 22 is an $O_2$ sensor that makes λ-output, the difference between a preset lean or rich period and the lean or rich period determined by the $O_2$ sensor, not the λ-output itself, may be used as actual A/F information that serves for the adjustment.

Although the multi-point injection gasoline engine is used as the engine 1 according to the embodiments described herein, the engine 1 may alternatively be a cylinder injection gasoline engine or diesel engine.

What is claimed is:

1. An exhaust emission control device for internal combustion engine, comprising:
    a three-way catalyst which is located in an exhaust passage of an internal combustion engine and combines an oxygen storage component capable of storing oxygen and a reducing agent storage component capable of storing a reducing agent;
    air-fuel ratio modulating means which modulates the air-fuel ratio of exhaust gas flowing into the three-way catalyst between a lean air-fuel ratio and a rich air-fuel ratio;
    oxygen storage estimating means for estimating an oxygen storage by the oxygen storage component;
    reducing agent storage estimating means for estimating a reducing agent storage by the reducing agent storage component; and
    air-fuel ratio modulation adjusting means which adjusts a lean period to be longer or the degree of leaning to be higher, during which the exhaust air-fuel ratio is a lean air-fuel ratio, compared with when the oxygen storage estimated by the oxygen storage estimating means exceeds a first given value if the oxygen storage is not higher than the first given value, and adjusts a rich period to be longer or the degree of enriching to be higher, during which the exhaust air-fuel ratio is a rich air-fuel ratio, compared with when the reducing agent storage estimated by the reducing agent storage estimating means exceeds a second given value if the reducing agent storage is not higher than the second given value.

2. The exhaust emission control device for internal combustion engine according to claim 1, wherein the three-way catalyst has the oxygen storage component in an exhaust upstream side portion and the reducing agent storage component in an exhaust downstream side portion.

3. The exhaust emission control device for internal combustion engine according to claim 2, wherein the three-way catalyst carries cerium (Ce) and/or zirconium (Zr), as a material having the oxygen storage component, on a carrier of the exhaust upstream side portion, and carries barium (Ba), calcium (Ca), and/or magnesium (Mg), as a material having the reducing agent storage component, on a carrier of the exhaust downstream side portion.

4. The exhaust emission control device for internal combustion engine according to claim 1, wherein the three-way catalyst is composed of an upstream catalyst on the upstream side of the exhaust gas and a downstream catalyst on the downstream side, the upstream and downstream catalysts having the oxygen storage component and the reducing agent storage component, respectively.

5. The exhaust emission control device for internal combustion engine according to claim 4, wherein the three-way catalyst carries cerium (Ce) and/or zirconium (Zr), as a material having the oxygen storage component, on a carrier of the upstream catalyst, and carries barium (Ba), calcium (Ca), and/or magnesium (Mg), as a material having the reducing agent storage component, on a carrier of the downstream catalyst.

6. The exhaust emission control device for internal combustion engine according to claim 1, wherein the three-way catalyst is composed of a catalyst having the oxygen storage component and a catalyst having the reducing agent storage component, the catalysts being arranged in layers on a carrier thereof.

7. The exhaust emission control device for internal combustion engine according to claim 6, wherein the three-way catalyst is composed of a lower catalyst having the reducing agent storage component and an upper catalyst having the oxygen storage component.

8. The exhaust emission control device for internal combustion engine according to claim 6, wherein the three-way catalyst carries cerium (Ce) and/or zirconium (Zr), as a material having the oxygen storage component, and carries barium (Ba), calcium (Ca), and/or magnesium (Mg), as a material having the reducing agent storage component.

9. The exhaust emission control device for internal combustion engine according to claim 1, wherein the three-way catalyst has a wash coat as the reducing agent storage component, formed with pores capable of storing the reducing agent.

10. The exhaust emission control device for internal combustion engine according to claim 9, wherein the opening area of each said pore is large enough to store CO and not large enough to store HC.

11. The exhaust emission control device for internal combustion engine according to claim 1, wherein the three-way catalyst carries cerium (Ce) and/or zirconium (Zr), as a material having the oxygen storage component, on a carrier of an exhaust upstream side portion, and has a wash coat formed with pores capable of storing the reducing agent, as the reducing agent storage component, on a carrier of an exhaust downstream side portion.

12. The exhaust emission control device for internal combustion engine according to claim 1, wherein the three-way catalyst carries cerium (Ce) and/or zirconium (Zr), as a material having the oxygen storage component, on a carrier of an exhaust upstream side portion, carries barium (Ba), calcium (Ca), and/or magnesium (Mg), as a material having the reducing agent storage component, on a carrier of an exhaust downstream side portion, and has a wash coat formed with pores capable of storing the reducing agent, as the reducing agent storage component, on a carrier of the exhaust downstream side portion.

13. The exhaust emission control device for internal combustion engine according to claim 1, wherein the three-way catalyst is composed of an upstream catalyst on the upstream side of the exhaust gas, an intermediate catalyst on the exhaust downstream side of the upstream catalyst, and a downstream catalyst on the exhaust downstream side of the intermediate catalyst, and the three-way catalyst carries cerium (Ce) and/or zirconium (Zr), as a material having the oxygen storage component, on a carrier of the upstream catalyst, carries barium (Ba), calcium (Ca), and/or magnesium (Mg), as a material having the reducing agent storage component, on a carrier of the intermediate catalyst, and has a wash coat formed with pores capable of storing the reducing agent, as the reducing agent storage component, on a carrier of the downstream catalyst.

14. The exhaust emission control device for internal combustion engine according to claim 1, wherein the three-way catalyst carries cerium (Ce) and/or zirconium (Zr), as a material having the oxygen storage component and the reducing agent storage component, on a carrier thereof.

15. The exhaust emission control device for internal combustion engine according to claim 1, wherein the oxygen storage estimating means cyclically repeatedly obtains a catalyst oxygen inflow and a catalyst CO inflow in accordance with an oxygen concentration, CO concentration, and exhaust flow rate, and obtains a last oxygen storage (n) from the following equation in accordance with the catalyst oxygen inflow and the catalyst CO inflow:

Last oxygen storage $(n)$=Catalyst oxygen inflow−Catalyst CO inflow×$K1$+Preceding oxygen storage $(n-1)$, where K1 is a transformation coefficient.

16. The exhaust emission control device for internal combustion engine according to claim 1, wherein the reducing agent storage estimating means cyclically repeatedly obtains a catalyst oxygen inflow and a catalyst CO inflow in accordance with an oxygen concentration, CO concentration, and exhaust flow rate, and obtains a last reducing agent storage (n) from the following equation in accordance with the catalyst oxygen inflow and the catalyst CO inflow:

Last reducing agent storage $(n)$=Catalyst CO inflow−Catalyst oxygen inflow×$K2$+Preceding reducing agent storage $(n-1)$, where K2 is a transformation coefficient.

17. The exhaust emission control device for internal combustion engine according to claim 1, wherein the air-fuel ratio modulation adjusting means adjusts the rich period to be shorter or the degree of enriching to be lower compared with when the reducing agent storage exceeds the second given value if the lean period is adjusted to be longer or the degree of leaning is adjusted to be higher compared with when the oxygen storage exceeds the first given value in accordance with oxygen storage information estimated by the oxygen storage estimating means, and adjusts the lean period to be shorter or the degree of leaning to be lower compared with when the oxygen storage exceeds the first given value if the rich period is adjusted to be longer or the degree of enriching is adjusted to be higher compared with when the reducing agent storage exceeds the second given value in accordance with reducing agent storage information estimated by the reducing agent storage estimating means.

18. The exhaust emission control device for internal combustion engine according to claim 1, wherein the air-fuel ratio modulating means modulates the air-fuel ratio to form a square or wavy wave such that the air-fuel ratio cyclically changes between richer air-fuel ratio than a target air-fuel ratio and leaner air-fuel ratio than the target air-fuel ratio.

19. The exhaust emission control device for internal combustion engine according to claim 1, wherein the air-fuel ratio modulating means includes an air-fuel ratio sensor for detecting and determining the exhaust air-fuel ratio on the upstream side of the catalyst, and modulates the air-fuel ratio between a given rich air-fuel ratio and a given lean air-fuel ratio in accordance with a decision made by the air-fuel ratio sensor.

* * * * *